(12) United States Patent
Wang et al.

(10) Patent No.: US 10,014,999 B2
(45) Date of Patent: Jul. 3, 2018

(54) METHODS FOR REPETITIVE TRANSMISSION OF PHYSICAL CONTROL CHANNEL, BASE STATION AND USER EQUIPMENT

(71) Applicant: SHARP KABUSHIKI KAISHA, Sakai, Osaka (JP)

(72) Inventors: Feng Wang, Shanghai (CN); Renmao Liu, Shanghai (CN)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 15/113,509

(22) PCT Filed: Jan. 12, 2015

(86) PCT No.: PCT/CN2015/070507
§ 371 (c)(1),
(2) Date: Jul. 22, 2016

(87) PCT Pub. No.: WO2015/109956
PCT Pub. Date: Jul. 30, 2015

(65) Prior Publication Data
US 2017/0012755 A1 Jan. 12, 2017

(30) Foreign Application Priority Data
Jan. 26, 2014 (CN) .......................... 2014 1 0037511

(51) Int. Cl.
*H04L 5/00* (2006.01)
*H04L 27/26* (2006.01)
(Continued)

(52) U.S. Cl.
CPC .............. *H04L 5/0053* (2013.01); *H04L 1/08* (2013.01); *H04L 5/0091* (2013.01); *H04L 5/0094* (2013.01); *H04L 27/261* (2013.01); *H04L 25/03866* (2013.01); *H04W 84/042* (2013.01); *H04W 88/02* (2013.01)

(58) Field of Classification Search
None
See application file for complete search history.

(56) References Cited

U.S. PATENT DOCUMENTS 9,674,710 B2 * 6/2017 Chen .................... H04W 16/18
2013/0230030 A1 * 9/2013 Papasakellariou H04W 72/0406
370/336
(Continued)

OTHER PUBLICATIONS

Huawei et al., "Timing relationship between PDCCH and PDSCH for coverage improvement," 3GPP TSG RAN WG1 Meeting #75, R1-135022, San Francisco, USA, Nov. 11-15, 2013, 4 pages, XP050734725.

(Continued)

*Primary Examiner* — Eunsook Choi
(74) *Attorney, Agent, or Firm* — Birch, Stewart, Kolasch & Birch, LLP

(57) ABSTRACT

The present disclosure provides a method for repetitive transmission of a physical control channel. The method comprises: transmitting the physical control channel in a number of Control Channel Elements (CCEs) of each subframe in a set of subframes for repetitive transmission of the physical control channel. The present disclosure also provides a method for receiving a physical control channel, a base station and a User Equipment.

8 Claims, 2 Drawing Sheets

(51) Int. Cl.
*H04L 1/08* (2006.01)
*H04L 25/03* (2006.01)
*H04W 84/04* (2009.01)
*H04W 88/02* (2009.01)

(56) References Cited

U.S. PATENT DOCUMENTS

| | | | |
|---|---|---|---|
| 2015/0181440 A1* | 6/2015 | Chen | H04W 16/18 370/329 |
| 2015/0181576 A1* | 6/2015 | Papasakellariou | H04L 1/0072 370/329 |
| 2016/0278054 A1* | 9/2016 | You | H04L 5/0053 |
| 2017/0230840 A1* | 8/2017 | Chen | H04W 16/18 |

OTHER PUBLICATIONS

Mediatek Inc., "Analysis of (E)PDCCH enhancements and timing relationship with PDSCH," 3GPP TSG-RAN WG1 #74b, R1-134444, Guangzhou, P.R. China, Oct. 7-11, 2013, 4 pages, XP050717561.
Mediatek Inc., "On the need of PDCCH for SIB and other Common Channels," 3GPP TSG-RAN WG1 #75, R1-135422, San Francisco, USA, Nov. 11-15, 2013, 6 pages, XP050735100.
Samsung, "PDCCH Coverage Enhancements for MTC UEs," 3GPP TSG RAN WG1 #75, R1-135198, San Francisco, USA, Nov. 11-15, 2013, pp. 1-2, XP050750818.
Overview of 3GPP Release 10 V0.2.1 (Jun. 2014), 144 pages.
Overview of 3GPP Release 8 V0.3.3 (Sep. 2014); 244 pages.

* cited by examiner

METHODS FOR REPETITIVE TRANSMISSION OF PHYSICAL CONTROL CHANNEL, BASE STATION AND USER EQUIPMENT

TECHNICAL FIELD

The present disclosure relates to wireless communication technology, and more particularly, to a method for repetitive transmission of a physical control channel, a method for receiving a physical control channel, a base station and a user equipment.

BACKGROUND

The Long Term Evolution (LTE) system deployed by the $3^{rd}$ Generation Partner Project (3GPP) is intended to provide increasingly diversified mobile communication services in the future. Wireless cellular communications have become an essential part of people's lives and work. In the first release (Release 8) of the 3GPP LTE, Orthogonal Frequency Division Multiple Access (OFDMA) and Multiple Input Multiple Output (MIMO) techniques have been introduced. After evaluation and test by International Telecommunication Union (ITU), the 3GPP Release 10 has been established as the $4^{th}$ generation global mobile communication standard, known as LTE-Advanced. In the LTE-Advanced standard, Carrier Aggregation (CA) and relay techniques have been introduced to improve uplink (UL)/downlink (DL) MIMO technique while supporting heterogeneous network (HetNet) deployment.

In order to meet the market demand on home device communications and the deployment of a huge-scale Internet of Things (IoT) in the future, the 3GPP has decided to introduce a low-cost Machine Type Communication (MTC) technique in the LTE and its further evolution, to transfer MTC services from the current GSM network to the LTE network and define a new type of User Equipment (UE), referred to as Low-cost MTC UE. Such UE can support MTC services in all duplex modes in the current LTE network and has: 1) one single receiving antenna; 2) a maximum Transport Block Size (TBS) of 1000 bits in UL/DL; and 3) a reduced baseband bandwidth of DL data channel of 1.4 MHz, a bandwidth of DL control channel identical to the system bandwidth of the network layer, and the same UL channel bandwidth and DL Radio Frequency (RF) part as UEs in the current LTE network.

The MTC is a data communication service without human involvement. A large-scale deployment of MTC UEs can be applied to various fields such as security, tracking, payment, measurement, consumer electronics, and in particular to applications such as video surveillance, supply chain tracking, intelligent metering and remote monitoring. The MTC requires low power consumption and supports low data transmission rate and low mobility. Currently, the LTE system is mainly designed for Human-to-Human (H2H) communication services. Hence, in order to achieve the scale benefit and application prospect of the MTC services, it is important for the LTE network to support the low-cost MTC devices to operate at low cost.

Some MTC devices are mounted in basements of residential buildings or locations protected by insulating films, metal windows or thick walls of traditional buildings. These devices will suffer significantly higher penetration loss in air interface than conventional device terminals, such as mobile phones and tablets, in the LTE network. The 3GGP has started researches on solution designs and performance evaluations for the LTE network to provide the MTC devices with a 20 dB of additional coverage enhancement. It is to be noted that an MTC device located in an area with poor network coverage has a very low data transmission rate, a very loose delay requirement and a limited mobility. For these MTC characteristics, some signaling and/or channels of the LTE network can be further optimized to support the MTC. The 3GPP requires providing the newly defined low cost UEs and other UEs running MTC services (e.g., with very loose delay requirements) with a certain level of LTE network coverage enhancement. In particular, a 15 dB of network coverage enhancement is provided in the LTE Frequency Division Duplex (FDD) network. Additionally, not all UEs running MTC services need the same network coverage enhancement.

For the new low-cost MTC devices, in the DL, the data channel is 1.4 MHz (i.e., 6 RBs) and the control channel can still access the entire DL system bandwidth in the baseband part, while the RF link part remains the same, i.e., the entire system bandwidth can be accessed. In the UL, the baseband part and the RF part both remain the same. In addition, the low-cost MTC UE has one single receiving antenna and its maximum UL transport block and DL transport block are each 1000 bits.

For 3GPP LTE UEs running MTC services in the coverage enhancement mode, the design and configuration of coverage enhancement for physical channels (such as Physical Downlink Control Channel (PDCCH), Physical Downlink Shared Channel (PDSCH), Physical Uplink Control Channel (PUCCH) and Physical Uplink Shared Channel (PUSCH)) need to be standardized. According to the discussions in the 3GPP RAN1 #74 meeting, after completion of the initial access, the configuration mode of any physical channel that requires repetitive transmission is decided at the base station. In the discussions in the 3GPP RAN1 #75 meeting, for an MTC UE in the coverage enhancement mode, its UE specific search space supports PDSCH scheduled by (E)PDCCH (i.e., PDCCH and/or Enhanced PDCCH) and supports a number of repetitive transmission levels for (E)PDCCH. From the perspective of UE, the potential start subframe of the repetitive transmission of (E)PDCCH should be limited to a certain set of subframes. The LTE does not support periodical repetitive transmission of CSI in PUCCH, but supports repetitive transmission of ACK/NACK in PUCCH and a number of repetitive transmission levels for PDSCH/PUSCH in time domain.

When a UE in the coverage enhancement mode runs an MTC application service, the PDCCH requires repetitive transmission in a number of subframes.

SUMMARY

It is an object of the present disclosure to provide a method for repetitive transmission of a physical control channel, a method for receiving a physical control channel, a base station and a UE, capable of repetitively transmitting, and accordingly receiving, the physical control channel.

In an aspect of the present disclosure, a method for receiving a physical control channel is provided. The method comprises: receiving the physical control channel in a number of Control Channel Elements (CCEs) of each subframe in a set of subframes for repetitive transmission of the physical control channel.

In an embodiment, an aggregation level for the repetitive transmission of the physical control channel is fixed, predefined or semi-statically configured, and an index of a start CCE for the repetitive transmission of the physical control channel is fixed, predefined or semi-statically configured.

In an embodiment, a position of each CCE and the number of the CCEs are fixed, predefined or semi-statically configured.

In an embodiment, the physical control channel in each subframe in the set of subframes for the repetitive transmission of the physical control channel uses a same scrambling sequence.

In a second aspect of the present disclosure, a User Equipment (UE) is provided. The UE comprises: a receiving unit configured to receive a physical control channel in a number of Control Channel Elements (CCEs) of each subframe in a set of subframes for repetitive transmission of the physical control channel.

In an embodiment, an aggregation level for the repetitive transmission of the physical control channel is fixed, predefined or semi-statically configured, and an index of a start CCE for the repetitive transmission of the physical control channel is fixed, predefined or semi-statically configured.

In an embodiment, a position of each CCE and the number of the CCEs are fixed, predefined or semi-statically configured.

In an embodiment, the physical control channel in each subframe in the set of subframes for the repetitive transmission of the physical control channel uses a same scrambling sequence.

In a third aspect of the present disclosure, a method for repetitive transmission of a physical control channel is provided. The method comprises: transmitting the physical control channel in a number of Control Channel Elements (CCEs) of each subframe in a set of subframes for repetitive transmission of the physical control channel.

In an embodiment, an aggregation level for the repetitive transmission of the physical control channel is fixed, predefined or semi-statically configured, and an index of a start CCE for the repetitive transmission of the physical control channel is fixed, predefined or semi-statically configured.

In an embodiment, a position of each CCE and the number of the CCEs are fixed, predefined or semi-statically configured.

In an embodiment, the physical control channel in each subframe in the set of subframes for the repetitive transmission of the physical control channel uses a same scrambling sequence.

In a fourth aspect of the present disclosure, a base station is provided. The base station comprises: a transmitting unit configured to transmit a physical control channel in a number of Control Channel Elements (CCEs) of each subframe in a set of subframes for repetitive transmission of the physical control channel.

In an embodiment, an aggregation level for the repetitive transmission of the physical control channel is fixed, predefined or semi-statically configured, and an index of a start CCE for the repetitive transmission of the physical control channel is fixed, predefined or semi-statically configured.

In an embodiment, a position of each CCE and the number of the CCEs are fixed, predefined or semi-statically configured.

In an embodiment, the physical control channel in each subframe in the set of subframes for the repetitive transmission of the physical control channel uses a same scrambling sequence.

With the present disclosure, it is possible to repetitively transmit, and accordingly receive, the physical control channel. It is also possible to improve resource utilization and spectrum/energy efficiency of UEs (particularly MTC UEs, including low-cost UEs or other UEs running delay-tolerant MTC services and requiring a certain amount of network coverage enhancement) and reduce inter-cell time/frequency resource collisions.

BRIEF DESCRIPTION OF THE DRAWINGS

The above and other objects, features and advantages will be more apparent from the following description of embodiments with reference to the figures, in which.

DETAILED DESCRIPTION

The principles and implementations of the present disclosure will become more apparent with reference to the following description of the embodiments taken in conjunction with the figures. It should be noted that the following embodiments are illustrative only, rather than limiting the scope of the present disclosure. In the following description, details of well known techniques which are not directly relevant to the present invention will be omitted so as not to obscure the concept of the invention.

In the following, a number of embodiments of the present invention will be detailed in an exemplary application environment of LTE mobile communication system and its subsequent evolutions. Herein, it is to be noted that the present invention is not limited to the application exemplified in the embodiments. Rather, it is applicable to other communication systems, such as the future 5G cellular communication system.

In the following examples, a PDCCH will be taken as an example of a physical control channel. However, it should be noted that the physical control channel is not limited to PDCCH.

Figure 1:
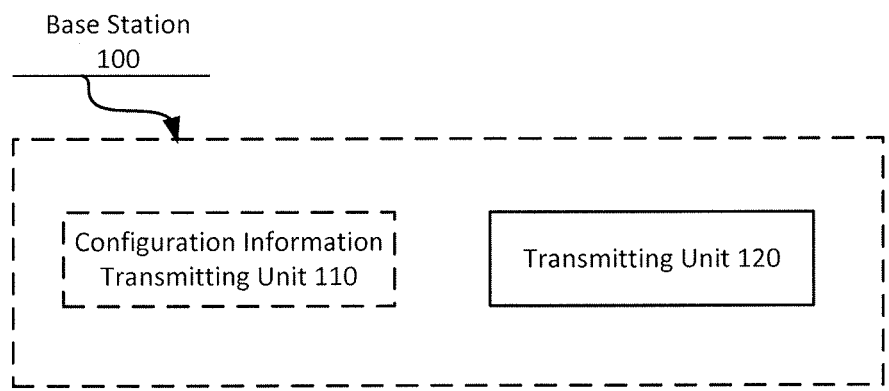
FIG. 1 is a block diagram of a base station according to the present disclosure.

FIG. 1 is a block diagram of a base station 100 according to the present disclosure. As shown, the base station 100 includes a transmitting unit 120. Optionally, the base station 100 can further include a configuration information transmitting unit 110. It can be appreciated by those skilled in the art that the base station 100 further includes other functional unit necessary for its functions, such as various processors and memories.

The transmitting unit 120 is configured to transmit a physical control channel in a number of Control Channel Elements (CCEs) of each subframe in a set of subframes for repetitive transmission of the physical control channel.

The configuration information transmitting unit 110 is configured to transmit configuration information to a UE. The configuration information includes at least a number (hereinafter denoted as N, where N≥2) of repetitive transmissions of Physical Downlink Control Channel (PDCCH) and a UE search space associated with each transmission.

It is to be noted that, in the context of the present disclosure, the term "PDCCH" may refer to Physical Downlink Control Channel (PDCCH) or enhanced Physical Downlink Control Channel (e-PDCCH). N repetitive transmissions of the PDCCH are referred to as a repetitive transmission period of the PDCCH.

For example, the transmitting unit 120 transmits a PDCCH to a UE repetitively for N times and each transmission occurs in its associated UE search space.

In an embodiment, in a repetitive transmission period of the PDCCH, the UE search space associated with each transmission includes subframes associated with a same scrambling code.

In particular, the subframes associated with the same scrambling code may include subframes having a same subframe number. In this case, the existing cell-specific and subframe-specific scrambling sequences can be reused (subframes having the same subframe number have a same subframe-specific scrambling sequence).

Figure 2:
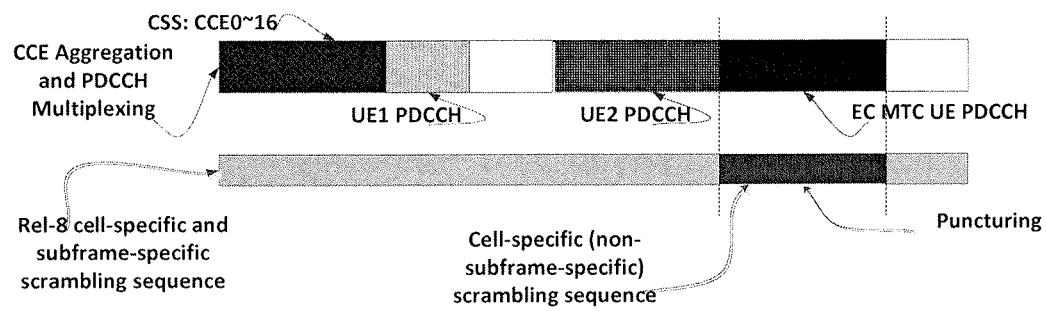
FIG. 2 is a schematic diagram showing scrambling for repetitively transmitted PDCCH according to an embodiment.

Alternatively, the subframes associated with the same scrambling code may include subframes having no subframe-specific scrambling code. In this case, a cell-specific and non-subframe-specific scrambling sequence can be used, i.e., all the subframes have the same scrambling code. FIG. 2 is a schematic diagram showing scrambling in this case. The upper portion of FIG. 2 shows search spaces consisting of CCEs and the lower portion of FIG. 2 shows their respective scrambling sequences. As shown, search spaces include a Common Search Space (CSS) and UE Search Spaces (USSs). For an ordinary UE (e.g., UE1 or UE2), its UE search space reuses the existing cell-specific and subframe-specific scrambling sequence. For a UE requiring repetitive transmission of PDCCH (e.g., a Coverage Enhanced (CE) MTC UE), its UE search space uses a cell-specific and non-subframe-specific scrambling sequence. In this case, the original LTE cell-specific and subframe-specific scrambling sequence need to be nulled at the CCEs in the UE search space and replaced with the non-subframe-specific scrambling sequence, while original scrambling sequences are maintained at CCEs elsewhere.

In another embodiment, the UE search space associated with each transmission includes subframes associated with different scrambling codes. In this case, the existing cell-specific and subframe-specific scrambling sequences can be reused.

In an embodiment, the configuration information can further include at least one of: a Control Format Indicator (CFI), a cell-specific offset associated with each UE search space, an aggregation level, and one or more CCE numbers associated with each transmission.

In particular, in a repetitive transmission period of PDCCH, in accordance with the number, N, of repetitive transmissions required for the UE as determined during a random access procedure, the number of OFDM symbols occupied by PDCCH (i.e., the value of CFI) is fixed, predefined, or semi-statically configured in all subframes for repetitive transmissions of the PDCCH. The value of CFI is determined in association with the downlink carrier bandwidth in the system. For example, CFI=3 when the system bandwidth is smaller than 5 MHz; or otherwise CFI=2.

In a repetitive transmission period of the PDCCH, each UE search space may have a cell-specific offset, which can be included in the configuration information.

In a repetitive transmission period of the PDCCH, in the subframes for the repetitive transmission of the PDCCH, one or more Aggregation Level (ALs) supporting the repetitive transmission of the PDCCH can be fixed, predefined, or semi-statically configured. Each AL represents the number of CCEs occupied by the PDCCH. The AL is associated with the system bandwidth. For example, AL=4 when the system bandwidth is smaller than 5 MHz; or otherwise AL=8.

In a repetitive transmission period of the PDCCH, in the subframes for the repetitive transmission of the PDCCH, an index of a start CCE (CCE or enhanced-CCE) supporting the repetitive transmission of the PDCCH can be fixed, predefined, or semi-statically configured.

In a repetitive transmission period of the PDCCH, indices of CCEs for transmitting the PDCCH in each subframe for the repetitive transmission of the PDCCH can be fixed, predefined, or semi-statically configured. In particular, a candidate CCE position can be fixed or semi-statically configured in each subframe, which is to be monitored by the UE in all the subframes for the repetitive transmission of the PDCCH. Alternatively, a number of candidate CCE positions can be fixed or semi-statically configured in each subframe for the repetitive transmission of the PDCCH. In this case, these candidate CCE positions are to be monitored by the UE in all the subframes for the repetitive transmission of the PDCCH.

The index of the start CCE for transmitting the PDCCH in the subframes can be configured to the UE semi-statically.

Further, the relationship between the AL of the PDCCH and the number of blind detections by the UE can be changed. For example, when AL=8, the number of blind detections by the UE can be limited to 1.

According to the present disclosure, the repetitive transmission of the PDCCH in MBMS subframes can be supported. The UE search space can be configured fixedly or semi-statically on MBMS subframes.

In an embodiment, an aggregation level for the repetitive transmission of the physical control channel is fixed, predefined or semi-statically configured, and an index of a start CCE for the repetitive transmission of the physical control channel is fixed, predefined or semi-statically configured.

In an embodiment, a position of each CCE and the number of the CCEs are fixed, predefined or semi-statically configured.

In an embodiment, the physical control channel in each subframe in the set of subframes for the repetitive transmission of the physical control channel uses a same scrambling sequence.

Figure 3:
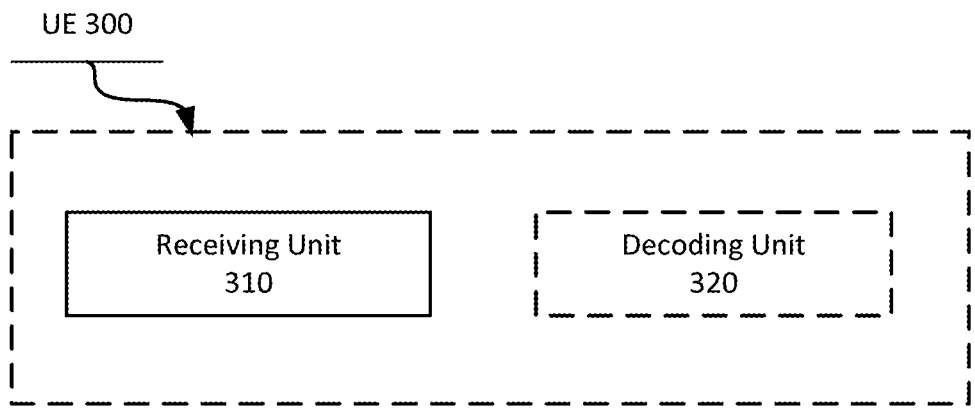
FIG. 3 is a block diagram of a UE according to the present disclosure.

FIG. 3 is a block diagram of a UE 300 according to the present disclosure. As shown, the UE 300 includes a receiving unit 310. Optionally, the UE 300 can further include a decoding unit 320. It can be appreciated by those skilled in the art that the UE 300 further includes other functional unit necessary for its functions, such as various processors and memories.

The receiving unit 310 is configured to receive a physical control channel in a number of Control Channel Elements (CCEs) of each subframe in a set of subframes for repetitive transmission of the physical control channel.

Optionally, the receiving unit 310 is configured to receive configuration information from a base station. The configuration information includes at least a number, N, of repetitive transmissions of Physical Downlink Control Channel (PDCCH) and a UE search space associated with each transmission. The receiving unit 320 is further configured to receive from the base station one or more downlink frames including the repetitive transmissions of the PDCCH.

The decoding unit 320 is configured to decode the PDCCH from the downlink frames based on the configuration information.

In an embodiment, in a repetitive transmission period of the PDCCH, the UE search space associated with each transmission includes subframes associated with a same scrambling code. In particular, the subframes associated with the same scrambling code may include subframes having a same subframe number or subframes having no subframe-specific scrambling code. In this case the decoding unit 320 is configured to: extract data associated with each transmission of the PDCCH from the downlink frames based on the configuration information; apply a Fourier transformation to the data associated with each transmission of the PDCCH to obtain frequency domain soft symbol information associated with each transmission of the PDCCH; combine the frequency domain soft symbol information associated with all the repetitive transmissions of the PDCCH; demodulate the combined frequency domain soft symbol information to obtain bit information; and descramble the bit information based on the same scrambling code.

In another embodiment, the UE search space associated with each transmission includes subframes associated with different scrambling codes. In this case, the decoding unit 320 is configured to: extract data associated with each transmission of the PDCCH from the downlink frames based on the configuration information; apply a Fourier transformation to the data associated with each transmission of the PDCCH to obtain frequency domain soft symbol information associated with each transmission of the PDCCH; descramble, for each transmission of the PDCCH, the frequency domain soft symbol information associated with that transmission based on a scrambling code associated with the subframes included in the UE search space associated with that transmission, so as to obtain soft bit information associated with that transmission of the PDCCH; combine the soft bit information associated with all the repetitive transmissions of the PDCCH; and demodulate the combined soft bit information.

Further, the complexity of the CCE combination can be limited. For example, given the number, N, of repetitive transmissions, an index of the start CCE can be configured semi-statically. In another example, given the number, N, of repetitive transmissions, in a repetitive transmission period of the PDCCH, the UE can combine one of the CCEs at a particular AL over all the subframes for the repetitive transmissions of the PDCCH. Alternatively, in a repetitive transmission period of the PDCCH, the UE can combine the CCEs having the same index at the same AL over all the subframes for the repetitive transmissions of the PDCCH.

Further, the configuration information can include at least one of: a Control Format Indicator (CFI), a cell-specific offset associated with each UE search space, an aggregation level, and one or more CCE numbers associated with each transmission.

In an embodiment, an aggregation level for the repetitive transmission of the physical control channel is fixed, predefined or semi-statically configured, and an index of a start CCE for the repetitive transmission of the physical control channel is fixed, predefined or semi-statically configured.

In an embodiment, a position of each CCE and the number of the CCEs are fixed, predefined or semi-statically configured.

In an embodiment, the physical control channel in each subframe in the set of subframes for the repetitive transmission of the physical control channel uses a same scrambling sequence.

In the following, the process flows of the methods according to the present disclosure will be described with reference to the figures. It is to be noted that all the features described in connection with the above embodiments of the base station 100 and the UE 300 also apply to the method embodiments below.

Figure 4:
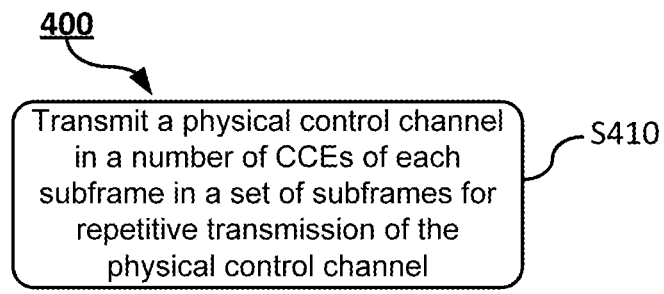
FIG. 4 is a flowchart illustrating a method for repetitive transmission of a physical control channel according to the present disclosure.

FIG. 4 is a flowchart illustrating a method 400 for repetitive transmission of a physical control channel according to the present disclosure. The method 400 can be performed by the base station 100 as described above and include the following steps.

At step S410, a physical control channel is transmitted in a number of Control Channel Elements (CCEs) of each subframe in a set of subframes for repetitive transmission of the physical control channel.

Optionally, the method 400 can further include: transmitting configuration information to a UE. The configuration information includes at least a number of repetitive transmissions of PDCCH and a UE search space associated with each transmission.

For example, in the step S410, the PDCCH is transmitted to the UE repetitively for the number of times. Here, each transmission occurs in its associated UE search space.

Preferably, the UE search space associated with each transmission includes subframes associated with a same scrambling code.

Preferably, the subframes associated with the same scrambling code include subframes having a same subframe number or subframes having no subframe-specific scrambling code.

Preferably, the UE search space associated with each transmission includes subframes associated with different scrambling codes.

Preferably, the configuration information further includes at least one of: a Control Format Indicator (CFI), a cell-specific offset associated with each UE search space, an aggregation level, and one or more CCE numbers associated with each transmission.

In an embodiment, an aggregation level for the repetitive transmission of the physical control channel is fixed, predefined or semi-statically configured, and an index of a start CCE for the repetitive transmission of the physical control channel is fixed, predefined or semi-statically configured.

In an embodiment, a position of each CCE and the number of the CCEs are fixed, predefined or semi-statically configured.

In an embodiment, the physical control channel in each subframe in the set of subframes for the repetitive transmission of the physical control channel uses a same scrambling sequence.

Figure 5:
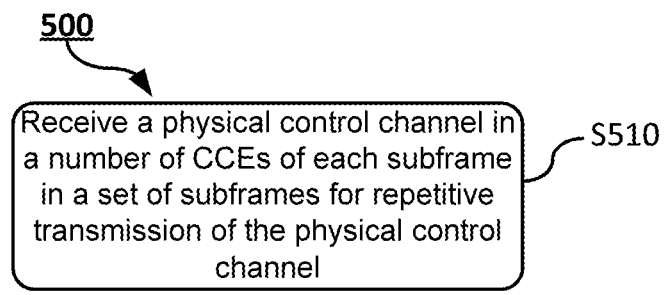
FIG. 5 is a flowchart illustrating a method for receiving a physical control channel according to the present disclosure.

FIG. 5 is a flowchart illustrating a method 500 for receiving a physical control channel according to the present disclosure. The method 500 can be performed by the UE 300 as described above and include the following steps.

At step S510, a physical control channel is received in a number of Control Channel Elements (CCEs) of each subframe in a set of subframes for repetitive transmission of the physical control channel.

Optionally, the method 500 further includes: receiving configuration information from a base station. The configuration information includes at least a number of repetitive transmissions of Physical Downlink Control Channel (PDCCH) and a UE search space associated with each transmission.

For example, in the step S510, one or more downlink frames including the repetitive transmissions of the PDCCH can be received from the base station.

Optionally, the method 500 further includes: decoding the PDCCH from the downlink frames based on the configuration information.

Preferably, the UE search space associated with each transmission includes subframes associated with a same scrambling code.

Preferably, the subframes associated with the same scrambling code may include subframes having a same subframe number or subframes having no subframe-specific scrambling code. The decoding step S530 includes: extracting data associated with each transmission of the PDCCH from the downlink frames based on the configuration information; applying a Fourier transformation to the data associated with each transmission of the PDCCH to obtain frequency domain soft symbol information associated with each transmission of the PDCCH; combining the frequency domain soft symbol information associated with all the repetitive transmissions of the PDCCH; demodulating the combined frequency domain soft symbol information to obtain bit information; and descrambling the bit information based on the same scrambling code.

Preferably, the UE search space associated with each transmission includes subframes associated with different scrambling codes. The decoding step S530 includes: extracting data associated with each transmission of the PDCCH from the downlink frames based on the configuration information; applying a Fourier transformation to the data associated with each transmission of the PDCCH to obtain frequency domain soft symbol information associated with each transmission of the PDCCH; descrambling, for each transmission of the PDCCH, the frequency domain soft symbol information associated with that transmission based on a scrambling code associated with the subframes included in the UE search space associated with that transmission, so as to obtain soft bit information associated with that transmission of the PDCCH; combining the soft bit information associated with all the repetitive transmissions of the PDCCH; and demodulating the combined soft bit information.

Preferably, the configuration information further includes at least one of: a Control Format Indicator (CFI), a cell-specific offset associated with each UE search space, an aggregation level, and one or more CCE numbers associated with each transmission.

In an embodiment, an aggregation level for the repetitive transmission of the physical control channel is fixed, pre-defined or semi-statically configured, and an index of a start CCE for the repetitive transmission of the physical control channel is fixed, predefined or semi-statically configured.

In an embodiment, a position of each CCE and the number of the CCEs are fixed, predefined or semi-statically configured.

In an embodiment, the physical control channel in each subframe in the set of subframes for the repetitive transmission of the physical control channel uses a same scrambling sequence.

It can be appreciated that the above embodiments of the present disclosure can be implemented in software, hardware or any combination thereof. For example, the internal components of the base station and the UE in the above embodiments can be implemented using various devices including, but not limited to, analog circuit device, digital circuit device, Digital Signal Processing (DSP) circuit, programmable processor, Application Specific Integrated Circuit (ASIC), Field Programmable Gate Array (FPGA), Programmable Logic Device (CPLD) and the like.

In the present disclosure, the term "base station" means a mobile communication data and control exchange center with a large transmit power and a wide coverage area and including functions such as resource allocation/scheduling, data reception/transmission and the like. The term "user equipment" means a user mobile terminal, including e.g., a mobile phone, a notebook computer and other terminal devices that can wirelessly communicate with a base station or and micro base station.

Further, the embodiments of the present disclosure can be implemented in computer program products. More specifically, a computer program product can be a product having a computer readable medium with computer program logics coded thereon. When executed on a computing device, the computer program logics provide operations for implementing the above solutions according to the present disclosure. When executed on at least one processor in a computing system, the computer program logics cause the processor to perform the operations (methods) according to the embodiments of the present disclosure. This arrangement of the present disclosure is typically provided as software, codes and/or other data structures provided or coded on a computer readable medium (such as an optical medium, e.g., CD-ROM, a floppy disk or a hard disk), or firmware or micro codes on other mediums (such as one or more ROMs, RAMs or PROM chips), or downloadable software images or shared databases in one or more modules. The software, firmware or arrangement can be installed in a computing device to cause one or more processors in the computing device to perform the solutions according to the embodiments of the present disclosure.

The present disclosure has been described above with reference to the preferred embodiments thereof. It should be understood that various modifications, alternations and additions can be made by those skilled in the art without departing from the spirits and scope of the present disclosure. Therefore, the scope of the present disclosure is not limited to the above particular embodiments but only defined by the claims as attached and the equivalents thereof.

The invention claimed is:

1. A User Equipment (UE), comprising:
monitoring circuitry configured to monitor a Physical Downlink Control Channel (PDCCH) in a set of PDCCH candidates,
wherein each of the PDCCH candidates is repeated in a set of repetition subframes, and
wherein a same scrambling sequence is applied to each of the PDCCH candidates repeated in a set of repetition subframes, and a scrambling sequence associated with a subframe is applied to a PDCCH candidate except the PDCCH candidates repeated in a set of repetition subframes.

2. The UE according to claim 1, wherein
the monitoring circuitry is configured to monitor the PDCCH in Enhanced Control Channel Elements (EC-CEs) of each subframe in the set of repetition subframes, wherein indices of ECCEs are same for the set of repetition subframes.

3. A base station, comprising:
transmitting circuitry configured to transmit a Physical Downlink Control Channel (PDCCH) in a set of PDCCH candidates,
wherein each of the PDCCH candidates is repeated in a set of repetition subframes, and
wherein a same scrambling sequence is applied to each of the PDCCH candidates repeated in a set of repetition subframes, and a scrambling sequence associated with a subframe is applied to a PDCCH candidate except the PDCCH candidates repeated in a set of repetition subframes.

4. The base station according to claim 3, wherein
the transmitting circuitry is configured to transmit the PDCCH in Enhanced Control Channel Elements (ECCEs) of each subframe in the set of repetition subframes, wherein indices of ECCEs are same for the set of repetition subframes.

5. A method for monitoring a physical downlink control channel (PDCCH), comprising:
monitoring a PDCCH in a set of PDCCH candidates,
wherein each of the PDCCH candidates is repeated in a set of repetition subframes, and
wherein a same scrambling sequence is applied to each of the PDCCH candidates repeated in a set of repetition subframes, and a scrambling sequence associated with a subframe is applied to a PDCCH candidate except the PDCCH candidates repeated in a set of repetition subframes.

6. The method according to claim 5, wherein
the PDCCH is monitored in Enhanced Control Channel Elements (ECCEs) of each subframe in the set of repetition subframes, wherein indices of ECCEs are same for the set of repetition subframes.

7. A method for transmitting a physical downlink control channel (PDCCH), comprising:
transmitting a PDCCH in a set of PDCCH candidates,
wherein each of the PDCCH candidates is repeated in a set of repetition subframes, and
wherein a same scrambling sequence is applied to each of the PDCCH candidates repeated in a set of repetition subframes, and a scrambling sequence associated with a subframe is applied to a PDCCH candidate except the PDCCH candidates repeated in a set of repetition subframes.

8. The method according to claim 7, wherein
the PDCCH is transmitted in Enhanced Control Channel Elements (ECCEs) of each subframe in the set of repetition subframes, wherein indices of ECCEs are same for the set of repetition subframes.

* * * * *